(12) United States Patent
Plasterer et al.

(10) Patent No.: US 11,388,765 B2
(45) Date of Patent: Jul. 12, 2022

(54) COMMUNICATIONS BETWEEN WIRELESS DEVICES IN BUILDING AUTOMATION AND CONTROL NETWORK

(71) Applicant: Autani, LLC, Columbia, MD (US)

(72) Inventors: Mark E. Plasterer, Ellicott City, MD (US); Scott E. Metker, Baltimore, MD (US); Alan D. Schnittman, Baltimore, MD (US); Justin A. Ethier, Sykesville, MD (US)

(73) Assignee: Autani, LLC, Columbia, MD (US)

( * ) Notice: Subject to any disclaimer, the term of this patent is extended or adjusted under 35 U.S.C. 154(b) by 106 days.

(21) Appl. No.: 17/075,979

(22) Filed: Oct. 21, 2020

(65) Prior Publication Data
US 2022/0124851 A1    Apr. 21, 2022

(51) Int. Cl.
| | |
|---|---|
| *H04W 4/00* | (2018.01) |
| *H04W 76/15* | (2018.01) |
| *H04L 12/40* | (2006.01) |
| *H04W 4/38* | (2018.01) |
| *H04W 84/18* | (2009.01) |

(52) U.S. Cl.
CPC ....... *H04W 76/15* (2018.02); *H04L 12/40052* (2013.01); *H04W 4/38* (2018.02); *H04W 84/18* (2013.01)

(58) Field of Classification Search
None
See application file for complete search history.

(56) References Cited

U.S. PATENT DOCUMENTS

| | | |
|---|---|---|
| 9,553,451 B2 | 1/2017 | Zacharchuk et al. |
| 10,455,663 B2 | 10/2019 | Greene et al. |
| 2016/0157326 A1 | 6/2016 | Kelly et al. |
| 2018/0090992 A1 | 3/2018 | Shrivastava et al. |
| 2018/0131478 A1 | 5/2018 | Song et al. |

FOREIGN PATENT DOCUMENTS

| | | |
|---|---|---|
| KR | 20130069125 A | 6/2013 |
| KR | 20160120650 A | 10/2016 |

*Primary Examiner* — Abdelillah Elmejjarmi
(74) *Attorney, Agent, or Firm* — Luedeka Neely Group, P.C.

(57) ABSTRACT

A manager device manages communications between wireless devices in a building automation and control (BAC) network. The manager device includes multiple RF modules and a CPU, all disposed within a single housing. Each RF module includes an antenna and RF transceiver for transmitting and receiving wireless RF signals to and from the wireless devices. Each RF transceiver of each RF module operates on a different RF frequency from the RF transceiver of each of the other RF modules. The CPU runs multiple processes in a wireless network protocol stack, including an event handler process and multiple transceiver control processes. The event handler process monitors events within the BAC network, and manages message traffic to and from the transceiver control processes. The transceiver control processes receive messages from and send messages to the event handler process. Each transceiver control process is associated with a corresponding one of the RF transceivers. Each transceiver control process sends messages to and receives messages from the wireless devices via its associated RF transceiver.

10 Claims, 6 Drawing Sheets

COMMUNICATIONS BETWEEN WIRELESS DEVICES IN BUILDING AUTOMATION AND CONTROL NETWORK

FIELD

This invention relates to the field of communications between devices in a building automation and control network. More particularly, this invention relates to a system for communicating with wireless sensor/control devices in a mesh network.

BACKGROUND

Building Automation and Control (BAC) networks provide communications between building automation devices, including sensor devices and control devices, for controlling building systems, such as lighting and HVAC. For example, a BAC network may include a wireless switch in one area of a building that triggers an on/off controller device in another area of the building to control lighting. In a typical installation, the switch communicates wirelessly with a first gateway device, and the controller device communicates wirelessly with a second gateway device. In this situation, a first antenna on the first gateway may receive a switch event signal from the sensor device when someone presses the switch, at which time a signal is sent to a first CPU in the first gateway. The first gateway may then use a TCP/IP network connection to communicate with the second gateway, either directly through a LAN or indirectly through the internet. Upon receipt of the switch event signal, a second CPU in the second gateway determines that it needs to turn on a light in the room controlled by the switch, and it transmits an on/off command signal from a second antenna on the second gateway to the controller device. This whole process could take less than a second or up to 10 seconds to complete if the messages need to transit through multiple gateways and protocols.

The first and second gateways are examples of management devices that provide communications between input and sensor devices and control devices. In conventional BAC networks, a management device may operate on a single communication channel in a mesh network and use a single antenna to communicate with over 400 devices. In such situations, the communications may be subject to a high rate of retransmissions and errors due to the sheer numbers of devices operating on the same channel.

As the number of devices using the same mesh network channel increases, the probability of signal collisions increases. This leads to successive retransmissions which can cause cascading failures within the network because of the high number of devices competing for the same bandwidth. This ultimately results in lost messages on the network as the retransmissions exceed the network timeout and retransmission limits. Additionally, large mesh networks are subject to protocol restrictions that may intentionally throttle certain types of traffic, such as broadcasts or multicasts. This throttling can also significantly delay or even prevent message delivery. These challenges lead to missed messages to and from devices, such as occupancy sensors, which could lead to lights in a room not turning on as an occupant enters the area. In the context of room lighting in which a response to new inputs is needed within a 1-2 second window, this sort of latency is a problem. It is less of a problem in the context of sensor networks and wireless thermostats, which can better tolerate delayed or missed messages.

The design of conventional building control systems usually involves a tradeoff between the number of control devices and the speed/response time of the system. Increasing the number of control devices in the system generally results in lower speed/response time and increases the possibility of lost messages. Typically, the design process involves increasing the number of devices until a lack of bandwidth results in speed limit problems, and then adding more devices on additional channels in order to increase the bandwidth until the system is fully loaded. In practice, most manufacturers establish rules for the maximum numbers of devices per gateway to ensure that radio traffic stays under a level that would cause speed or retransmission issues. When this limit is reached in an area of the building, additional gateways on separate radio frequencies are deployed along with the requisite Local Area Network cable drops for each new gateway. This adds additional costs and complexity to the installation.

What is needed, therefore, is a building automation and control network communication system that minimizes communication latency and the probability of signal collisions while reducing the need for additional wired network infrastructure, even as the number of sensor/control devices on the network increases.

SUMMARY

The above and other needs are met by a manager device for managing the communication of messages to and from wireless devices in a building automation and control (BAC) network. In one embodiment, the manager device includes a plurality of radio frequency (RF) modules and a central processing unit (CPU), all disposed within a single portable housing. Each RF module includes an antenna and an RF transceiver for receiving wireless RF signals from and transmitting wireless RF signals to the wireless devices in the BAC network. The antenna and RF transceiver of each RF module operate on a different RF frequency from the antenna and RF transceiver of each of the other RF modules in the same manager device.

The CPU executes software instructions to run multiple processes in a wireless network protocol stack, including an event handler process and multiple transceiver control processes. The event handler process monitors events occurring within the building automation and control network, and manages message traffic to and from the transceiver control processes, with each managing communications on separate radio channels. The transceiver control processes receive messages from and send messages to the event handler process. Each transceiver control process is associated with a corresponding one of the RF transceivers of one of the RF modules in the manager device. Each transceiver control process processes messages sent to and received from the wireless devices via its associated RF transceiver.

In some embodiments, the manager device includes a printed circuit board disposed within the single housing, and the CPU is disposed on the printed circuit board along with the antennas and RF transceivers of the RF modules.

In some embodiments, the manager device includes three RF modules and three transceiver control processes.

In some embodiments, the manager device includes four or five RF modules, wherein the antennas of up to two of the RF modules are external to the single housing and are connected via modular connectors.

In some embodiments, the event handler process communicates with the transceiver control processes using a remote procedure call protocol.

In some embodiments, each transceiver control process communicates with its associated RF transceiver using a serial communication protocol.

In some embodiments, the building automation and control network comprises multiple mesh networks spanning separate channels, such as Zigbee networks.

In some embodiments, the transceiver control processes are child processes spawned by the event handler process.

In some embodiments, the event handler process monitors events occurring within the building automation and control network based on the wireless RF signals transmitted from the wireless devices.

In another aspect, a method is provided for communicating messages to and from wireless devices in a building automation and control network. A preferred embodiment of the method includes:

(a) sensing an event in the building automation and control network and generating event information based thereon;

(b) transmitting a first wireless RF signal containing the event information from a first wireless device in the building automation and control network, the first wireless RF signal having a first RF frequency on a first RF channel;

(c) receiving the first wireless RF signal by a first RF module of a manager device, wherein the first RF module operates on the first RF channel;

(d) providing the event information contained in the first wireless RF signal to a first transceiver control process running in a wireless network protocol stack in a central processing unit (CPU) of the manager device;

(e) the first transceiver control process sending an incoming message containing the event information to an event handler process running in the wireless network protocol stack in the CPU of the manager device;

(f) based at least in part on the event information contained in the incoming message, the event handler process sending an outgoing message to a second transceiver control process running on the wireless network protocol stack in the CPU of the manager device, the outgoing message containing command information;

(g) the second transceiver control process providing the outgoing message to a second RF module of the manager device, wherein the second RF module operates on a second RF channel that is different from the first RF channel;

(h) transmitting a second wireless RF signal by the second RF module on the second RF channel, wherein the second wireless RF signal contains the command information and has a second RF frequency that is different from the first RF frequency;

(i) receiving the second wireless RF signal by a second wireless device in the building automation and control network; and (j) controlling an operation in the building automation and control network based on the command information in the second wireless RF signal.

In some embodiments of the method, steps (e) and (f) are performed using a remote procedure call protocol.

In some embodiments of the method, steps (d) and (g) are performed using a serial communication protocol.

In some embodiments of the method, the building automation and control network comprises multiple mesh networks, such as Zigbee networks, each operating on a separate channel.

In some embodiments of the method, the event handler process spawns the first and second transceiver control processes.

In yet another aspect, an embodiment is directed to a building automation and control network that includes a plurality of wireless devices and at least one manager device. The wireless devices are for sensing events and controlling operations in the building automation and control network. The wireless devices include a wireless sensor device for sensing an event and generating an incoming wireless RF signal containing event information.

The manager device includes multiple RF modules and a CPU. Each of the RF modules in the manager device includes an antenna and an RF transceiver for receiving incoming wireless RF signals from and transmitting outgoing wireless RF signals to the plurality of wireless devices. The RF transceiver of each RF module operates on a different RF frequency from the RF transceiver of each of the other RF modules.

The CPU of the manager device executes software instructions to run multiple processes in a wireless network protocol stack. The multiple processes include an event handler process and multiple transceiver control processes. The event handler process monitors events occurring within the building automation and control network based on the event information contained in the incoming wireless RF signals from the plurality of wireless devices. The event handler process also manages message traffic to and from the transceiver control processes. The transceiver control processes receive messages from and send messages to the event handler process. Each transceiver control process is associated with a corresponding one of the RF transceivers of one of the RF modules, and processes messages sent to and received from the wireless devices in the building automation and control network via the associated RF transceiver. The wireless devices include a wireless control device for controlling an operation in the building automation and control network based on a command message contained in an outgoing wireless RF signal transmitted from the manager device.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
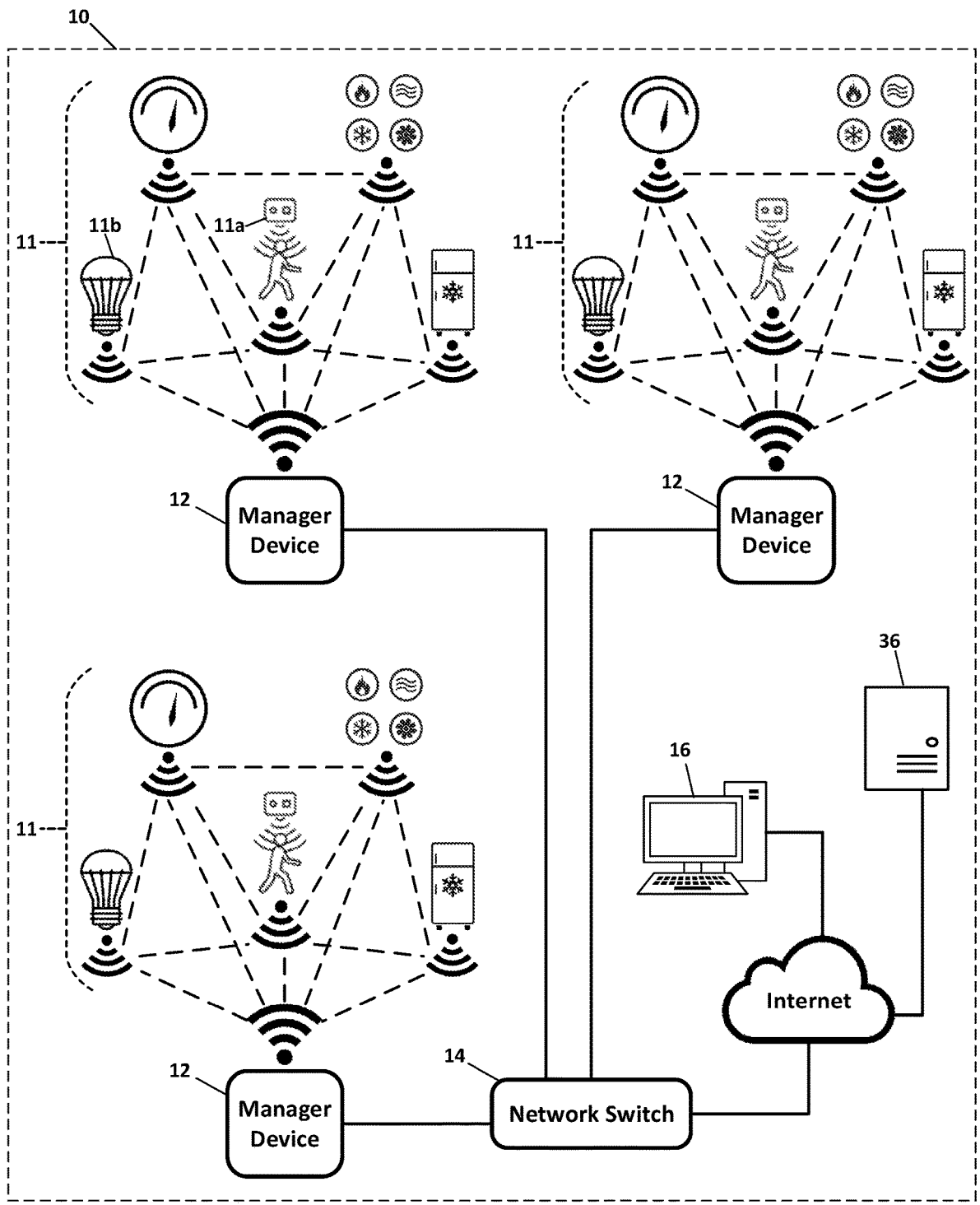
FIG. 1 depicts a system for providing communications between building automation devices in a mesh network according to an embodiment of the invention.

As depicted in FIG. 1, a preferred embodiment of a Building Automation and Control (BAC) network 10 may include many sensor/control devices 11 used in controlling applications, such as heating/ventilation/air-conditioning (HVAC), lighting, metering, building access, fire detection, and refrigeration systems. The sensor/control devices 11 communicate with manager devices 12 in multiple mesh networks, such as Zigbee networks. Each manager device 12 is connected through a network switch 14 in a local area network that is in communication with the internet. In a preferred embodiment, an end user interacts with the network 10 using an end user computer 16 that has access through the internet to a cloud-based BAC network user interface program, such as Autani EnergyCenter software, running on a remote server 36. As described in more detail hereinafter, the system 10 operates in such a manner that the end user may be unaware that the manager devices 12 are controlling the sensor/control devices 11 on the multiple underlying mesh networks.

As the term is used herein, a "mesh network" is a local network topology in which infrastructure nodes are operable to dynamically and directly connect to as many other nodes as possible, and to cooperate with one another in a non-hierarchical structure to efficiently route data between clients on the network. Generally, all wireless devices operating in a single mesh network communicate with each other on the same communication channel on the same RF frequency. As used herein, the phrase "mesh network" may also refer to a larger wireless network that includes multiple independent mesh networks or subnets, each operating on a separate communication channel.

Figure 2:
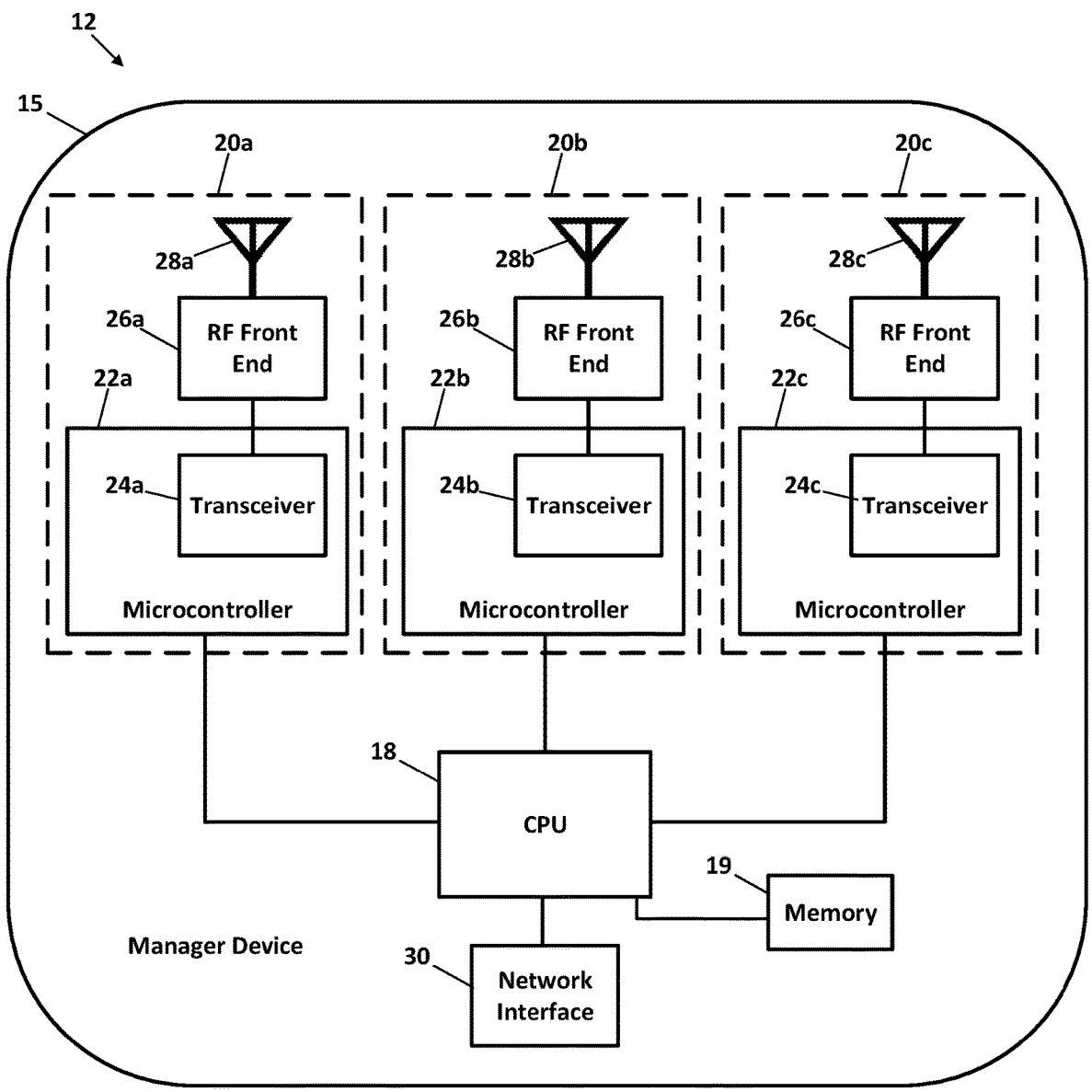
FIG. 2 depicts a functional block diagram of a manager device that manages communications between building automation devices in the mesh network of FIG. 1 according to an embodiment of the invention.

In a preferred embodiment depicted in FIG. 2, each manager device 12 includes a CPU 18 in communication with multiple radio frequency (RF) modules 20a, 20b, and 20c, each operating on a different Zigbee channel. Although the preferred embodiment includes three RF modules operating on three channels, it will be appreciated that more or fewer RF modules could be implemented in other embodiments. Each RF module 20a-20c includes a microcontroller 22a-22c, such as a Silicon Labs EM357 chip, that has an onboard RF transceiver 24a-24c operating in a frequency band allocated for communications under the IEEE 802.15.4 standard. Each RF module 20a-20c also includes an RF front end 26a-26c, such as a Skyworks SE2432L chip, that connects the RF transceiver 24a-24c to an antenna 28a-28c. In a preferred embodiment depicted in FIG. 5, the antennas 28a-28c are printed circuit elements residing on the same PC board 17 as the CPU 18, the microcontrollers 22a-22c, and the RF front end modules 26a-26c. All of the components of the manager device 12 of FIG. 2 are preferably contained within a single portable housing 15 constructed from plastic.

Figure 3:
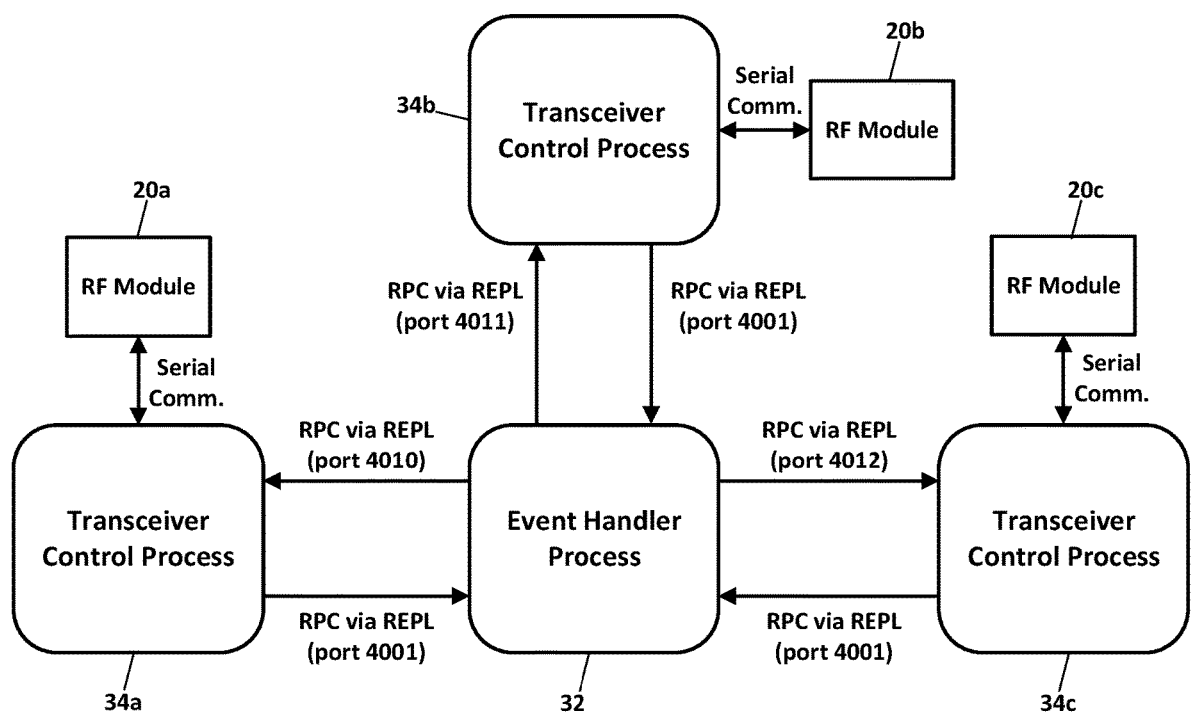
FIG. 3 depicts communications between processes running in a processor of the manager device of FIG. 2 according to an embodiment of the invention.

The CPU 18 of each manager device 12 runs Zigbee protocol stack software, such as EmberZNet software by Silicon Labs, to execute processes for controlling communications with the RF modules 20a-20c. In a preferred embodiment depicted in FIG. 3, those processes include an event handler process 32 and multiple transceiver control processes 34a-34c.

The event handler process 32 is a multi-threaded application server engine that runs autonomously and handles events associated with the building automation network. The event handler process 32 manages all message traffic to and from the transceiver control processes 34a-34c, preferably using a remote procedure call (RPC) protocol in a read-eval-print loop (REPL) environment. In a preferred embodiment, the event handler process 32 communicates with the transceiver control processes 34a-34c by dispatching EmberZNet calls.

The transceiver control processes 34a-34c—each associated with a corresponding one of the RF modules 20a-20c—are child processes spawned by the event handler process 32. In preferred embodiments, each transceiver control process 34a-34c uses an individual EmberZNet Serial Protocol (EZSP) thread to make calls into the EmberZNet framework. Each transceiver control process 34a-34c receives command messages from the event handler process 32, and sends incoming messages to the event handler process 32 using RPC protocol in the REPL environment. Each transceiver control process 34a-34c also sends command messages to sensor/control devices 11 and receives incoming messages from the control/sensor devices 11 via its dedicated transceiver 24a-24c, RF front end 26a-26c, and antenna 28a-28c on its dedicated Zigbee channel using a serial communication protocol on a Universal Asynchronous Receiver/Transmitter (UART) device. By using three different transceivers and three different antennas operating on three different Zigbee channels, interference between the channels is minimized. Although the preferred embodiment includes three transceiver control processes, it will be appreciated that more or fewer transceiver control processes could be implemented in other embodiments.

In alternative embodiments, instances of transceiver control processes may run on processors in different physical machines than the CPU on which the event handler process 32 is running. For example, a low-cost Advanced RISC Machine (ARM) controller may run an instance of a transceiver control process to control the network in a local area, and it may communicate back to the event handler process 32 running on a different machine.

In a preferred embodiment, each antenna 28a-28c is mapped to its associated transceiver control process 34a-34c running the Zigbee protocol stack software. A transceiver control process is started when a filesystem mount point, such as "/dev/ttySO", is passed to a control process at startup. Each control process must be passed a separate mount point, and each mount point represents a separate microcontroller (i.e. 22a-22c) interface within the CPU for communicating with transceivers 24a-24c, respectively. The mount point/transceiver mappings are preferably defined in a table stored in memory 19 that is accessible to the CPU 18.

Each of the RF modules 20a-20c of each manager device 12 is considered to be a node in the Zigbee network. Each node in the network is assigned a unique 16-bit node ID number (also referred to as a Short Address). In a preferred embodiment, the node ID is masked to a 32-bit value, and extra bits are used to identify the antenna. For example, the 16 bit device 0x9999 would prepended with 0x0001, giving a resulting antenna+node identifier of 0x00019999. Thus, the event handler process 32 may dispatch a call to one of the transceiver control processes 34a-34c as follows:

(zag (nid→antenna nid)'(remote-call,nid))

where "zag" is a shorthand identifier for a transceiver control process, and "nid" is the node ID.

Figure 4:
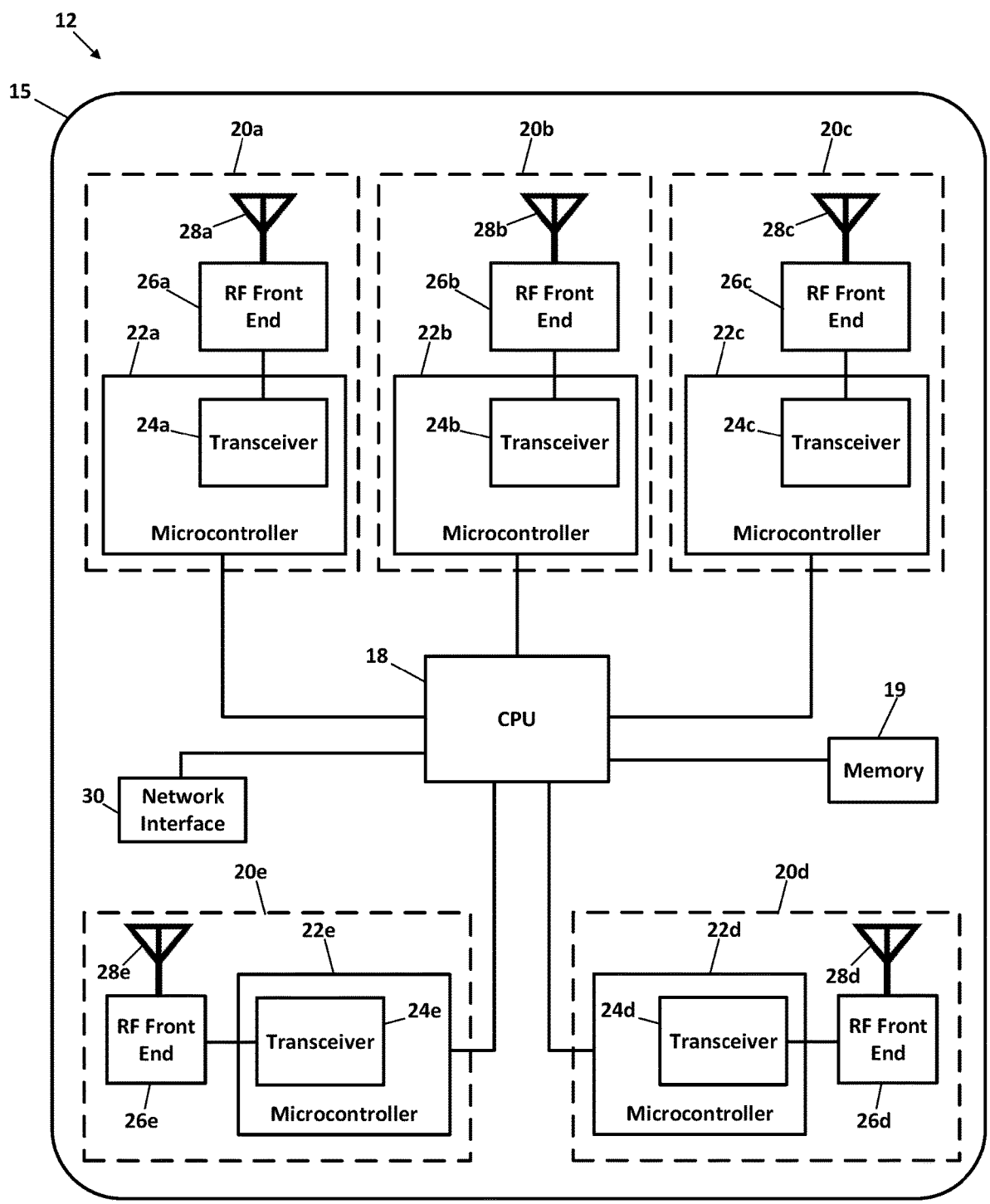
FIG. 4 depicts a functional block diagram of a manager device that manages communications between building automation devices in the mesh network of FIG. 1 according to an alternative embodiment of the invention.

In some embodiments as depicted in FIG. 4, the manager device 12 includes additional RF modules 20d and 20e that provide connections to two external antennas 28d and 28e, along with a dedicated transceiver 24d and 24e for each external antenna. Depending on the particular application, these external antennas 28*d*-28*e* may operate on Zigbee channels that are different from, or the same as, the channels of the internal antennas 28*a*-28*c*. In most applications, to avoid interference with other transmissions from the same manager device 12, the external antennas 28*d*-28*e* will operate on entirely different channels. The external antennas 28*d*-28*e* are typically used to communicate with sensor/control devices 11 that are further away or more difficult to communicate with because of shielding at the manager installation site.

Figure 5:
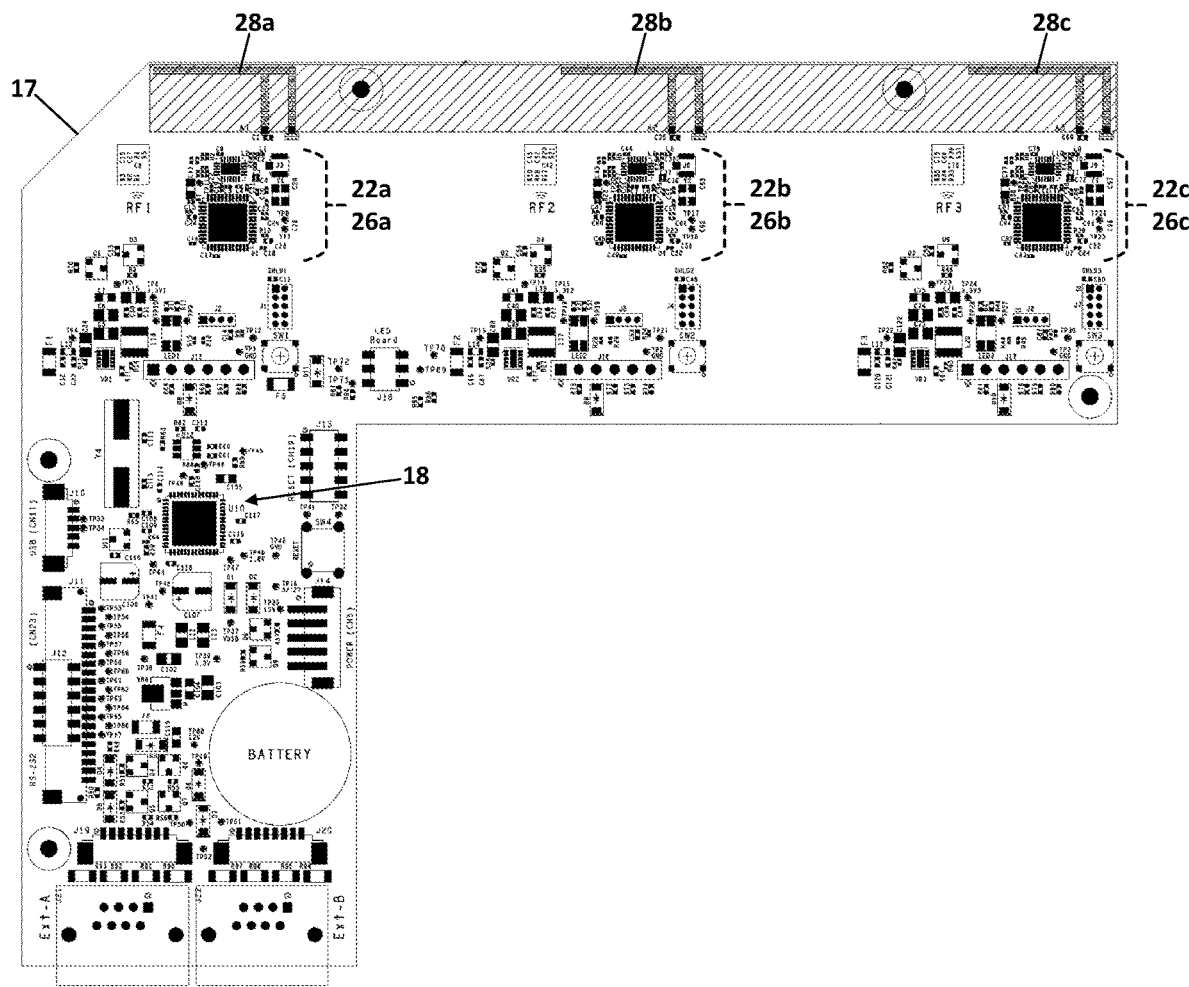
FIG. 5 depicts a printed circuit board layout for a manager device according to a preferred embodiment in which multiple printed circuit antennas reside on the same board as the CPU, microcontrollers, and RF front end modules.
Figure 6:
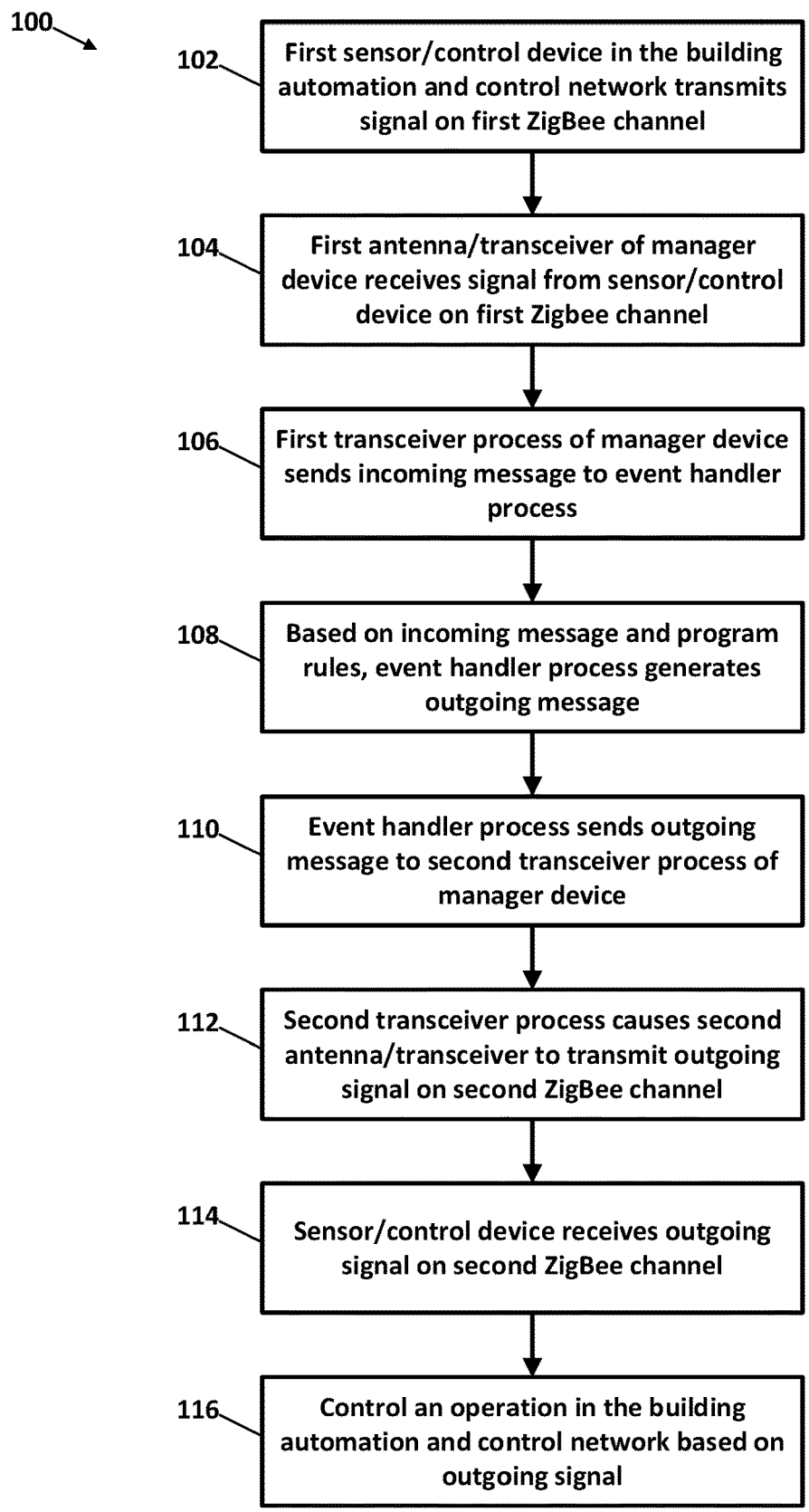
FIG. 6 depicts steps of a method for communicating between building automation devices in a mesh network according to an embodiment of the invention.

With reference to FIGS. 1-3 and 6, in one exemplary situation, a person enters a room which causes an occupancy sensor device 11*a* to transmit an occupancy signal on a first Zigbee channel (step 102 in FIG. 5). The antenna 28*a* in the manager device 12 that is operating on the first Zigbee channel receives the transmitted occupancy signal (step 104). This causes the transceiver control process 34*a* associated with the RF module 20*a* and the antenna 28*a* to send a corresponding occupancy message (via port 4001) to the event handler process 32 (step 106). In response to the occupancy message and based on program rules, the event handler process 32 generates a turn-on-light message (step 108) that is communicated (via port 4011) to the transceiver control process 34*b* (step 110). In response to the turn-on-light message, the transceiver control process 34*b* causes transceiver 24*b* of the RF module 20*b* to transmit a turn-on-light signal via the antenna 28*b* on a second Zigbee channel (step 112). The turn-on-light signal is received by a lighting control device 11*b* that is also operating on the second Zigbee channel in the Zigbee network (step 114), thereby triggering the lighting control device 11*b* to turn on the lights in the room that the person entered (step 116).

It will be appreciated that all of the message communications in the above example were communicated within the same CPU level in the protocol stack software. Thus, the occupancy message and the turn-on-light message need to rise no higher in the stack than the CPU level at which the event handler process 32 and the transceiver control processes 34*a*-34*c* are running. This results in the turn-on-light signal being transmitted significantly faster after receipt of the occupancy signal, such as on the order of milliseconds. Thus, in preferred embodiments of the present invention, there is no need for a TCP/IP notification to travel through a local network or through a cloud service that links two separate gateways as in conventional systems, which may take several seconds. The elimination of separate gateways with their separate hardwired network connections also reduces installation and maintenance costs as compared to conventional systems.

In addition to increasing the communication speed, preferred embodiments described herein also solve the error problems caused by signal collisions in crowded networks. A conventional approach to solving such error problems has been to simply limit to 120 the number of devices being controlled by a single management device, which has been somewhat effective in eliminating latency, retries, and timeouts. The approach implemented by the preferred embodiments—the use of manager devices 12 that each have multiple RF modules and antennas for operating on multiple Zigbee communication channels—extends the capability of a single manager device 12 to control up to 360 devices on the network (three times 120). With the addition of the external antennas in some embodiments of the manager device 12, an additional 120 devices per antenna can be controlled.

Including multiple RF modules and antennas in each manager device 12 allows for the use of more channels per device (and more channels per network connection), which increases the bandwidth available to communicate with the sensor/control devices 11. Although increased bandwidth provides the ability to control more devices 11, it does not necessarily lead to an increase in speed because it does not make a single message travel any faster. However, increased bandwidth makes the system faster because of other related factors as discussed hereinafter.

Having multiple channels per manager device 12 increases speed when the system 10 is under heavy load for several reasons. First, increasing the number of channels per manager device results in lower latency during periods of high demand. For the same number of communication nodes, providing three antennas and three channels on each of those nodes results in the ability to send messages faster. This is because there is no need to wait to send each message, as is often the case when there are clusters of messages waiting in line for the next open window to get out on a single channel/antenna. This situation can occur when the system is heavily oversubscribed, resulting in network busy errors at the transceiver and having to retry sending the messages. In some cases, there may be a wait time of one to two seconds before a message can be sent because too many other messages are in process.

Secondly, increasing the number of channels per manager device 12 results in lower error rates and retransmissions. Typically, when too many devices try to transmit at the same time on the same communication channel, they may all encounter an error and attempt a retransmission. When this happens, the Zigbee protocol allows for multiple retransmissions at random time intervals to help "unclog" the communication channel. This can actually congest the communication channel even more, resulting in response times of up to three to four seconds as messages are retried multiple times. In a worst-case scenario, messages may simply be dropped.

Thirdly, increasing the number of channels per manager device overcomes certain Zigbee protocol limitations. For example, certain "costly" events in the Zigbee protocol—such as broadcasts to all devices—are limited strictly to eight messages in nine seconds on a single channel. Having three channels per manager device 12 allows for sending twenty-four broadcasts in nine seconds, assuming that the broadcasts are evenly divided between the three channels. It should be appreciated that this is not a radio frequency limitation, but rather a limitation imposed by the Zigbee protocol to provide support for very low-power/small devices that cannot maintain extensive routing tables.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for communicating messages to and from wireless devices in a building automation and control network, the method comprising:

(a) sensing an event in the building automation and control network and generating event information based thereon;
(b) transmitting a first wireless RF signal containing the event information from a first wireless device in the building automation and control network, the first wireless RF signal having a first RF frequency on a first RF channel in a first RF network;
(c) receiving the first wireless RF signal by a first RF module of a manager device, wherein the first RF module operates on the first RF channel;
(d) providing the event information contained in the first wireless RF signal to a first transceiver control process running in a wireless network protocol stack in a central processing unit (CPU) of the manager device;
(e) the first transceiver control process sending an incoming message containing the event information to an event handler process running in the wireless network protocol stack in the CPU of the manager device, wherein the first transceiver control process has been spawned by the event handler process;
(f) based at least in part on the event information contained in the incoming message, the event handler process sending an outgoing message to a second transceiver control process running on the wireless network protocol stack in the CPU of the manager device, the outgoing message containing command information, wherein the second transceiver control process has been spawned by the event handler process;
(g) the second transceiver control process providing the outgoing message to a second RF module of the manager device, wherein the second RF module operates in a second RF network on a second RF channel that is different from the first RF channel;
(h) transmitting a second wireless RF signal by the second RF module on the second RF channel, wherein the second wireless RF signal contains the command information and has a second RF frequency that is different from the first RF frequency;
(i) receiving the second wireless RF signal by a second wireless device in the building automation and control network; and
(j) controlling an operation in the building automation and control network based on the command information in the second wireless RF signal.

2. The method of claim 1 wherein steps (e) and (f) are performed using a remote procedure call protocol.

3. The method of claim 1 wherein steps (d) and (g) are performed using a serial communication protocol.

4. The method of claim 1 wherein the first and second RF networks comprise mesh networks.

5. The method of claim 4 wherein the first and second RF networks comprise Zigbee networks.

6. A system for communicating messages within a building automation and control network, the system comprising:
a first wireless device that senses an event in the building automation and control network, generates event information based thereon, and transmits a first wireless RF signal containing the event information, the first wireless RF signal having a first RF frequency on a first RF channel in a first RF network;
a manager device having a first RF module that receives the first wireless RF signal on the first RF channel, and provides the event information contained in the first wireless RF signal to a first transceiver control process running in a wireless network protocol stack in a central processing unit (CPU) of the manager device;
the first transceiver control process sending an incoming message containing the event information to an event handler process running in the wireless network protocol stack in the CPU of the manager device;
the event handler process sending an outgoing message to a second transceiver control process running on the wireless network protocol stack in the CPU of the manager device, the outgoing message containing command information;
the second transceiver control process providing the outgoing message to a second RF module of the manager device, wherein the second RF module operates in a second RF network on a second RF channel;
the second RF module transmitting a second wireless RF signal on the second RF channel, wherein the second wireless RF signal contains the command information and has a second RF frequency; and
a second wireless device in the building automation and control network that receives the second wireless RF signal, and controls an operation in the building automation and control network based on the command information in the second wireless RF signal,
wherein the event handler process spawns the first and second transceiver control processes.

7. The system of claim 6 wherein the first and second transceiver control processes are performed using a remote procedure call protocol.

8. The system of claim 6 wherein the event information is provided to the first transceiver control process using a serial communication protocol, and the outgoing message is provided to the second RF module of the manager device using a serial communication protocol.

9. The system of claim 6 wherein the first and second RF networks comprise mesh networks.

10. The method of claim 9 wherein the first and second RF networks comprise Zigbee networks.

* * * * *